(12) United States Patent
Lambricht et al.

(10) Patent No.: US 11,214,507 B2
(45) Date of Patent: Jan. 4, 2022

(54) GLASS SHEET APPROACHING NEUTRALITY IRRESPECTIVE OF ITS THICKNESS

(71) Applicant: AGC GLASS EUROPE, Louvain-la-Neuve (BE)

(72) Inventors: Thomas Lambricht, Perwez (BE); Audrey Dogimont, Sart-Dames-Avelines (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 0 days.

(21) Appl. No.: 16/318,558

(22) PCT Filed: Jul. 18, 2017

(86) PCT No.: PCT/EP2017/068137
§ 371 (c)(1),
(2) Date: Jan. 17, 2019

(87) PCT Pub. No.: WO2018/015392
PCT Pub. Date: Jan. 25, 2018

(65) Prior Publication Data
US 2019/0284088 A1    Sep. 19, 2019

(30) Foreign Application Priority Data
Jul. 20, 2016 (EP) .................... 16180344

(51) Int. Cl.
| | | |
|---|---|---|
| *C03C 3/083* | (2006.01) | |
| *C03C 3/095* | (2006.01) | |
| *C03C 3/091* | (2006.01) | |
| *C03C 4/00* | (2006.01) | |
| *C03C 3/078* | (2006.01) | |
| *C03C 3/087* | (2006.01) | |
| *C03C 3/085* | (2006.01) | |

(52) U.S. Cl.
CPC ............. *C03C 3/083* (2013.01); *C03C 3/078* (2013.01); *C03C 3/091* (2013.01); *C03C 3/095* (2013.01); *C03C 4/0092* (2013.01); *C03C 3/085* (2013.01); *C03C 3/087* (2013.01); *C03C 2204/00* (2013.01)

(58) Field of Classification Search
CPC ......... C03C 3/078; C03C 3/087; C03C 3/095; C03C 4/02; C03C 4/0092; C03C 3/083; C03C 3/091
See application file for complete search history.

(56) References Cited

U.S. PATENT DOCUMENTS

| | | |
|---|---|---|
| 5,030,593 A | 7/1991 | Heithoff |
| 6,218,323 B1 | 4/2001 | Bretschneider et al. |
| 2007/0161492 A1* | 7/2007 | Smith ................ C03C 1/002 501/64 |
| 2008/0085827 A1 | 4/2008 | Thomsen et al. |
| 2014/0154440 A1 | 6/2014 | Iida et al. |
| 2014/0326314 A1* | 11/2014 | Dogimont ............ H01L 31/048 136/259 |
| 2019/0284087 A1* | 9/2019 | Lambricht ............... C03C 4/02 |

FOREIGN PATENT DOCUMENTS

DE  298 19 347 U1  1/2000

OTHER PUBLICATIONS

International Search Report dated Oct. 6, 2017 in PCT/EP2017/068137 filed on Jul. 18, 2017.

* cited by examiner

*Primary Examiner* — Elizabeth A. Bolden
(74) *Attorney, Agent, or Firm* — Oblon, McClelland, Maier & Neustadt, L.L.P.

(57) ABSTRACT

A glass sheet having a composition comprising a total iron content of 0.002-0.03% expressed in the form of $Fe_2O_3$ and in weight percentage with respect to the total weight of glass, and further satisfying the formula $N^*_5 \leq 0.05$; $N^*_5$ being defined as $N^*_5 = \sqrt{(a^*_5 - a^*_0)^2 + (b^*_5 - b^*_0)^2}$, $a^*_5$ and $b^*_5$ being measured for a sheet thickness of 5 mm in transmission with illuminant D65, 10°, SCI; $a^*_0$ and $b^*_0$ being computed for a sheet thickness of 0 mm in transmission with illuminant D65, 10°, SCI. Such a glass sheet allows a color rendering of the sheet which is essentially the same whatever the view path available for an observer of the object integrating said glass sheet (when looking through its main faces or through its edges or through a zone bearing a diffusing coating).

16 Claims, 2 Drawing Sheets

GLASS SHEET APPROACHING NEUTRALITY IRRESPECTIVE OF ITS THICKNESS

1. TECHNICAL FIELD OF THE INVENTION

The present invention relates to a glass sheet with a high luminous transmission and having a composition allowing to approach neutrality (or at least to keep a constant color) whatever the thickness of said glass sheet.

This invention is particularly suitable due to its aesthetics and high luminous transmission as building glass or interior glass, like for example in furniture applications, or as automotive glass, or also as cover glass in electronic devices/displays.

2. DESCRIPTION OF THE PRIOR ART

In the art, "ultra-white" or "extra-clear" glasses are known since years in the solar or building domain, due to their high luminous and/or energetical transmission. These glasses contain low amount of iron and are thereby also often called "low-iron glasses".

Iron exists in the glass in the form of ferric ions $Fe^{3+}$ and ferrous ions $Fe^{2+}$. The presence of ferric ions gives to the glass a slight absorption of visible light of short wavelength and a higher absorption in the near ultraviolet (absorption band centered on 380 nm), while the presence of ferrous ions (sometimes expressed as FeO oxide) causes a strong absorption in the near infrared (absorption band centered on 1050 nm). Ferric ions provide a light yellow coloration while ferrous ions give a pronounced blue-green color. Thus, the increase of the total iron content (both forms) enhances the absorption in the visible, to the detriment of light transmission.

Low-iron glasses comprise typically total iron in an amount less than 0.04 wt % or even less than 0.02 wt % (expressed as $Fe_2O_3$) and are generally considered as substantially colorless. Nevertheless, it is a known that, even if such glasses in the form of a sheet can be qualified as colorless when looking through their main faces when its thickness is not to high (classically, ~4 mm corresponding to view path), it is clearly significantly colored when the view path is increased (for example, if the thickness of the sheet is increased or if one looks trough the edges).

When considering classical low-iron solar glass sheets, like for example Sunmax® glass from the Company AGC Glass Europe, one can observe that:
a) when looking through their main faces, it is colorless for the naked eye for a thickness of 4 mm;
b) when looking through the edges of a 4-mm thick sheet, it has a greenish-yellowish tint;
c) when looking through their main faces, it has a visible greenish-yellowish tint, for example at a very high thickness (i.e. 30 mm).

Such a coloration of low-iron glass sheets when the view path inside the glass increases is clearly an issue in some applications, mainly for aesthetical reasons. One of these applications is the use of a low-iron glass sheet as a cover for display, the glass sheet being arranged (i) with their edges in the direct field of view of an observer and/or (ii) with a white enamel on the surroundings of the screen above which the glass sheet is arranged. In each of configurations (i) (looking through the edges) and (ii) looking through the surroundings with an enamel which diffuses the light), the view path of an observer is significantly increased compared to view path perpendicular to the main faces of the sheet. As an example, for a cover glass sheet of 0.7 mm thickness, the view path through the zone with the diffusing white enamel is increased (sometimes significantly depending on the view), which results in a undesirable coloration viewed from that zone. This diffusing phenomenon is illustrated at FIG. 1 (not at scale, only for illustrative purpose).

Several solutions have been developed in the last years to render a low-iron glass sheet more "colorless".

One of these solutions is to further decrease the total iron content in the composition of the glass sheet. However, this solution increases drastically the resulting glass cost because a very low iron content requires expensive, very pure starting materials and/or also their purification. Moreover, it is limited to a minimum level of iron for processing reasons (furnace wear highly accelerated, quality issues, yield loss, higher consumption during low-iron production).

Next to that, it has been also proposed to avoid the undesired green/yellow tint of low-iron glass sheets with an increased view path (through the edges or with a higher thickness) by producing a more pleasing color (for example an azure/blue tint) that dominates over the initial green/yellow color, for a given sheet thickness. This solution however still gives a coloration to a low-iron glass sheet when the view path is increased (increased thickness), even if this coloration is more pleasant aesthetically.

It is also important to mention that one additional issue when increasing the view path resides in some cases, next to an increase in the color intensity, in a color change. Such an undesirable phenomenon requires glass composition to be adapted if one wants to produce industrially sheets with different thicknesses for a same commercial product (with fixed specifications in terms of color, optical properties, etc). Of course, this is clearly disadvantageous in terms of costs, time for transitions, logistics, etc.

Finally, some other glass compositions have also been proposed allowing to target the neutrality (for example, as described in WO2003/064342 and WO2008/045271). Neutrality of a glass sheet is generally evaluated through its vicinity to the illuminant (0;0 coordinate in a*b* system), meaning that the target of such solutions is a*, b* close to 0 for a given thickness (generally, 4 or 6 mm depending on the final applications integrating the glass sheet). However, targeting such zero-values a*, b* for a given thickness does not allow, with these known compositions, to maintain the same a*b* target (and thus to keep neutrality) if the view path is increased. Indeed, such known glass compositions have been developed to get neutrality for a given and fixed thickness. For example, if such a glass sheet with a 0.7 mm-thickness is neutral (a*, b* ~0), meaning that it is colorless when viewed from its main faces, it does not fix completely the problem of variation in coloration/coloration intensity if different view path lengths are available by an observer (i.e. through the edges or through the surroundings with a diffusing coating). Moreover, if one imagines such a glass sheet with a thickness varying through its length, a gradient of color will be observed, and in a more pronounced manner as the thickness variation is high. Finally, if one wants to get the same color rendering result with a different thickness, the composition should then be adapted with severe disadvantages as cited above.

In conclusion, the state of the art does not provide any solution to get a low-iron glass sheet having a high luminous transmission and having a composition allowing to reach almost neutrality and to keep a significantly constant color irrespective of the sheet thickness, meaning that the color rendering of this glass sheet will be essentially the same whatever the view path available for an observer of the glass sheet (when looking through its main faces or through its edges or through a zone bearing a diffusing coating). Moreover, with such a solution, if one wants to get the same color rendering result with a different thickness, there will be no need anymore to adapt the composition, which represents a great advantage in terms of manufacturing and product range.

In a general manner and in present text in particular, the neutrality N of a glass sheet (and consequently of its edges) can be evaluated through its vicinity to the illuminant (0;0 coordinate in a*b* system).

3. OBJECTIVES OF THE INVENTION

The present invention has notably the objective of overcoming the cited drawbacks of the prior art.

More precisely, one objective of the invention is to provide a low-iron glass sheet having a composition allowing to get a color rendering of said sheet which is essentially the same whatever the view path available for an observer of the object integrating said glass sheet (when looking through its main faces or through its edges or through a zone bearing a diffusing coating).

Another objective of the invention is to provide a low-iron glass sheet having a composition allowing to approach neutrality and with significantly constant color whatever the sheet thicknesses and with a fixed composition.

Another objective of the invention is to provide such a low-iron glass sheet which has a high luminous transmission.

Still another objective of the invention is to provide a solution to the disadvantages of the prior art that is simple, economical and easy to manufacture.

4. DETAILED DESCRIPTION OF THE INVENTION

The invention relates to a glass sheet having a composition comprising a total iron content of 0.002-0.03% expressed in the form of $Fe_2O_3$ and in weight percentage with respect to the total weight of glass.

Moreover, the glass sheet of the invention has: $N^*_5 \leq 0.05$; $N^*_5$ being defined as $N^*_5 = \sqrt{(a^*_5 - a^*_0)^2 + (b^*_5 - b^*_0)^2}$, $a^*_5$ and $b^*_5$ being measured for a sheet thickness of 5 mm in transmission with illuminant D65, 10°, SCI; $a^*_0$ and $b^*_0$ being computed for a sheet thickness of 0 mm in transmission with illuminant D65, 10°, SCI.

Hence, the invention lies on a novel and inventive approach since it enables to find a solution for the disadvantages of prior art. The inventors have indeed surprisingly found that targeting a $N^*_5$ factor lower than or equal to 0.05, allows to obtain a glass sheet with a high luminous transmission and with a significantly stable color (~constant a* and b*) irrespective of its thickness. Moreover, in specific embodiments, the inventors have discovered that it is possible to obtain a glass sheet with a color close from neutrality, and stable (~constant a* and b*) irrespective of its thickness. Indeed, in present invention, the target in color allows to reach a "bulk color" that compensates for the color induced by the reflection at the faces, which means that the advantages of the invention (constant color irrespective of the thickness) exists whatever the way to reach the target (different compositions with different colorants and colorants amounts).

The ability of a glass sheet to have significantly the same color irrespective of its thickness is quantified in this invention by the $N^*_5$ factor. In present invention, the $N^*_5$ factor is defined as the distance between the color in transmission ($a^*_5$; $b^*_5$ coordinates) of a 5 mm-thick glass sheet and the color in transmission of said glass sheet computed in a known manner in the art at a thickness of 0 mm ($a^*_0$; $b^*_0$ coordinates). It means that the zero-thickness point ($a^*_0$; $b^*_0$ coordinates) is only influenced by the reflection of the glass sheet and, therefore, its refractive index at the different wavelengths of the spectrum, the refractive index of the glass sheet depending on the base glass matrix. Therefore, the $N^*_5$ factor herein is defined as:

$$N^*_5 = \sqrt{(a^*_5 - a^*_0)^2 + (b^*_5 - b^*_0)^2}.$$

For sake of clarity, in order to compute the color in transmission of a theoretical glass of 0 mm-thickness, one should use the classical formula for light transmission nu (at all wavelengths, λ):

$$T(\lambda) = \frac{(1 - rho(\lambda))^2 \cdot e^{-nu(\lambda) \cdot thickness}}{1 - rho(\lambda)^2 \cdot e^{-2 \cdot nu(\lambda) \cdot thickness}}$$

For a 0 mm-thick glass, this simplifies to:

$$T(\lambda) = \frac{(1 - rho(\lambda))}{(1 + rho(\lambda))}, \text{ with } rho(\lambda) = \rho(\lambda) = \frac{(n(\lambda) - 1)^2}{(n(\lambda) + 1)^2}$$

and n(λ) is the refractive index of the glass at wavelength λ.

Various well known methods can be used equally in order to obtain the refractive index n(λ) of a given glass, including computation based on glass composition, direct measurement (index liquid), computation based on transmission and reflection measurements, . . . .

In the case of industrial produced glass, faces might be influenced by the forming/annealing process—for instance having a bottom surface significantly enriched in tin oxide in the case of float process. These surface modification can have an impact on the optical property of the glass, but are not straightforward linked to the glass thickness. In order to avoid any misleading consideration about industrial faces, in case of industrially produced glass, both surfaces should be mirror polishing in a known manner in the art prior to measurement, to remove any unstable process impact on the optical properties.

The transmission spectrum obtained by gathering the transmission values computed at all wavelengths in the visible range is then used in a classical manner to compute the $a^*_0$ and $b^*_0$ values for a D65, 10° illuminant.

Typically, for a classical soda-lime glass matrix, the computed "zero-thickness point" is $a^*_0 = 0.03$ and $b^*_0 = 0.08$. For the sake of clarity, approaching the "zero-thickness point" with a glass sheet allows to have quite neutral and stable color whatever the glass thickness, it also means that a glass sheet having a low $N^*_5$ factor will also exhibit a low $N^*_x$ factor at higher thicknesses x like, for example, 12 mm or 100 mm or even above. The N* factor can indeed also be determined for other thickness than 5 mm. In such an event, for a thickness x, the $N^*_x$ factor is defined as:

$$N^*_x = \sqrt{(a^*_x - a^*_0)^2 + (b^*_x - b^*_0)^2};$$

$a^*_x$, $b^*_x$ coordinates being determined for of a x mm-thick glass.

Other features and advantages of the invention will be made clearer from reading the following description of preferred embodiments and figures, given by way of simple illustrative and non-restrictive examples.

Throughout the present text, when a range is indicated, the extremities are included, except if explicitly described in another way. In addition, all the integral and subdomain values in the numerical range are expressly included as if explicitly written. Moreover, throughout the present text also, values of content in percentages are by weight (also mentioned as wt %) expressed with respect to the total weight of the glass. Finally, when a glass composition is given, this relates to the bulk composition of the glass.

In present description and claims, to evaluate the color or the degree of neutrality/achromaticity of a glass sheet of a given thickness, one considers CIELab values: a* and b* (measured in transmission with illuminant D65, 10°, SCI). More precisely, in present description and claims, the neutrality of a glass sheet (and consequently of its edges) is evaluated through its vicinity to the illuminant (0;0 coordinate in a*b* system) for a given thickness, and it is defined as $N=\sqrt{a*^2+b*^2}$.

In present description and claims, to quantify the luminous transmission of a glass sheet, one considers the total light transmission with illuminant D65 (LTD) at a solid angle of observation of 2° (according to standard ISO9050). The light transmission represents the percentage of light flux emitted between wavelengths 380 nm and 780 nm which is transmitted through the glass sheet.

Preferably, the glass sheet according to the invention has a LTD4 (LTD for a sheet thickness of 4 mm) higher than 65%, 70%, 75%, 80%, 85%, 87%, 88%, 89%, or even higher than 90%, or better higher than 90.5%, 90.75% or even more better higher than 91%.

According to the invention, the glass sheet has: $N*_5 \leq 0.05$. Advantageously, the lowest the $N*_5$ factor, the better result on stability in color according to thickness. Preferably, the glass sheet has: $N*_5 \leq 0.04$, or better: $N*_5 \leq 0.03$. More preferably, the glass sheet has: $N*_5 \leq 0.02$ or even more better: $N*_5 \leq 0.01$ or $\leq 0.005$. Ideally, the glass sheet has: $N*_5 = 0$.

The glass sheet according to the invention may have varied and relatively large sizes. It can, for example, have sizes ranging up to 3.21 m×6 m or 3.21 m×5.50 m or 3.21 m×5.10 m or 3.21 m×4.50 m ("PLF" glass sheet) or also, for example, 3.21 m×2.55 m or 3.21 m×2.25 m ("DLF" glass sheet). The glass sheet according to the invention may have a thickness from 0.1 to 30 mm, either constant along its length or varying along its length.

Preferably, the glass of the invention is completely amorphous material, thereby excluding any crystalline material, even partially crystalline material (such as, for example, glass-crystalline or glass-ceramic materials).

The glass sheet according to the invention can be a glass sheet obtained by a floating process, a drawing process, a rolling process or any other process known to manufacture a glass sheet starting from a molten glass composition. According to a preferred embodiment according to the invention, the glass sheet is a float glass sheet. The term "float glass sheet" is understood to mean a glass sheet formed by the float glass process, which consists in pouring the molten glass onto a bath of molten tin, under reducing conditions. A float glass sheet comprises, in a known way, a "tin face", that is to say a face enriched in tin in the body of the glass close to the surface of the sheet. The term "enrichment in tin" is understood to mean an increase in the concentration of tin with respect to the composition of the glass at the core, which may or may not be substantially zero (devoid of tin).

According to the invention, the composition of the invention comprises total iron (expressed in terms of $Fe_2O_3$) as follows: 0.002-0.03 wt %. In present description, when talking about total iron content in glass composition, "total iron" and "$Fe_2O_3$" are used as well. According to an embodiment, the composition comprises total iron $\geq 0.004$ wt %. Preferably, the composition comprises total iron $\geq 0.005$ wt %. More preferably, the composition comprises total iron $\geq 0.006$ wt % or even, $\geq 0.007$ wt %. The minimum values make possible not to excessively damage the cost of the glass as such low iron values often require expensive, very pure, starting materials and also their purification. Preferably, the composition comprises total iron $\leq 0.02$ wt %. More preferably, the composition comprises total iron $\leq 0.015$ wt % or even $\leq 0.01$ wt %. The decreasing of maximum value in total iron allows to reach higher and higher values of luminous transmission. To avoid any doubt herein, each embodiment concerning lower limits in total iron is of course combinable independently with any possible embodiment concerning higher limits in total iron.

The glass sheet according to the invention is made of glass which may belong to various categories. The glass can thus be a glass of soda-lime-silica, aluminosilicate or borosilicate type, and the like. Preferably, the composition of the glass sheet comprises the following in weight percentage, expressed with respect to the total weight of glass:

| | |
|---|---|
| $SiO_2$ | 40-78% |
| $Al_2O_3$ | 0-18% |
| $B_2O_3$ | 0-18% |
| $Na_2O$ | 0-20% |
| CaO | 0-15% |
| MgO | 0-10% |
| $K_2O$ | 0-10% |
| BaO | 0-5%. |

More preferably, notably for low production costs reasons, the glass composition is a soda-lime-silicate-type glass. According to this embodiment, by "soda-lime-silicate-type glass", it is meant that the base glass matrix of the composition comprises the following in weight percentage, expressed with respect to the total weight of glass:

| | |
|---|---|
| $SiO_2$ | 60-78 wt % |
| $Al_2O_3$ | 0-8 wt % |
| $B_2O_3$ | 0-4 wt % |
| CaO | 0-15 wt % |
| MgO | 0-10 wt % |
| $Na_2O$ | 5-20 wt % |
| $K_2O$ | 0-10 wt % |
| BaO | 0-5 wt %. |

According to this embodiment, preferably, the base glass matrix of the composition comprises the following in weight percentage, expressed with respect to the total weight of glass:

| | |
|---|---|
| $SiO_2$ | 60-78 wt % |
| $Al_2O_3$ | 0-6 wt % |
| $B_2O_3$ | 0-1 wt % |
| CaO | 5-15 wt % |
| MgO | 0-8 wt % |
| $Na_2O$ | 10-20 wt % |

| $K_2O$ | 0-10 wt % |
| --- | --- |
| BaO | 0-1 wt %. |

In a preferred embodiment of the invention, the composition comprises the following in weight percentage, expressed with respect to the total weight of glass:
65≤$SiO_2$≤78 wt %
5≤$Na_2O$≤20 wt %
0≤$K_2O$<5 wt %
1≤$Al_2O_3$<6 wt %
0≤CaO<4.5 wt %
4≤MgO≤12 wt %
(MgO/(MgO+CaO))≥0.5.

In another preferred embodiment of the invention, the composition comprises the following in weight percentage, expressed with respect to the total weight of glass:
65≤$SiO_2$≤78%
5≤$Na_2O$≤20%
0≤$K_2O$<5%
3<$Al_2O_3$≤5%
0<CaO<4.5%
4≤MgO≤12%;
0.88≤[MgO/(MgO+CaO)]<1.

In another preferred embodiment of the invention, the composition comprises the following in weight percentage, expressed with respect to the total weight of glass:
60≤$SiO_2$≤78%
5≤$Na_2O$≤20%
0.9<$K_2O$≤12%
4.9≤$Al_2O_3$≤8%
0.4<CaO<2%
4<MgO≤12%

In another preferred embodiment of the invention, the composition comprises the following in weight percentage, expressed with respect to the total weight of glass:
65≤$SiO_2$≤78 wt %
5≤$Na_2O$≤20 wt %
1≤$K_2O$<8 wt %
1≤$Al_2O_3$<6 wt %
2≤CaO<10 wt %
0≤MgO≤8 wt %
$K_2O$/($K_2O$+$Na_2O$): 0.1-0.7.

In particular, examples of base glass matrixes for the composition according to the invention are described published PCT patent applications WO2015/150207A1 and WO2015/150403A1, in filed PCT patent applications WO2016/091672 A1 and WO2016/169823A1, and in EP patent application no16176447.7.

The above mentioned compositions with high MgO are especially well-suited as they allow to increase light transmission by decreasing the proportion of 6-folded $Fe^{2+}$ ions in the glass matrix, hence decreasing the strong absorption peak of $Fe^{2+}$ in the end of visible/near-IR range. In the same way, it has been shown (for example, in US20100304949A1) that glass compositions with higher $K_2O$ amount allows to increase luminous transmission, which makes the above compositions containing $K_2O$ especially well-suited for the purpose of the invention.

According to an embodiment of the invention, the composition has a redox ratio ≤32%. The redox ratio in present invention is in accordance with what is generally acknowledged in the art of glass composition and is defined as the ratio of the $Fe^{2+}$ content (as calculated as $Fe_2O_3$) to the total iron content (expressed as $Fe_2O_3$). According to an embodiment of the invention, the composition of the invention has a redox ratio ≤30%. Preferably, the composition of the invention has a redox ratio ≤28%, or even ≤26%, or even better ≤25%.

According to a particularly advantageous first main embodiment of the invention, the composition of the invention comprises erbium (expressed in the form of $Er_2O_3$) as follows: 0.003-0.5 wt %. Preferably, the composition comprises $Er_2O_3$≥0.005 wt %. More preferably, the composition comprises $Er_2O_3$≥0.01 wt % or even, ≥0.015 wt % or even better, ≥0.02 wt %. These minimum values allows to better target the objective. Preferably, the composition comprises $Er_2O_3$≤0.2 wt %. More preferably, the composition comprises $Er_2O_3$≤0.1 wt % or even, ≤0.08 wt % or even better, ≤0.06 wt %. These decreasing maximum values make possible (i) not to excessively damage the cost of the glass as erbium raw materials are very expensive, (ii) not to excessively damage the luminous transmission, and (iii) avoid a too excessive dichroism phenomenon. To avoid any doubt herein, each embodiment concerning lower limits in $Er_2O_3$ is of course combinable independently with any possible embodiment concerning higher limits in $Er_2O_3$.

According to this first main embodiment of the invention, preferably, the composition of the invention comprises: 1.3*$Fe_2O_3$≤$Er_2O_3$−21.87*$Cr_2O_3$−53.12*Co≤2.6*$Fe_2O_3$. In the invention, it is understood that chromium and cobalt are components that are only optional. In this formula, all amounts must be expressed with the same unit (wt % or ppm). Preferably, the composition comprises: 1.4*$Fe_2O_3$≤$Er_2O_3$−21.87*$Cr_2O_3$−53.12*Co. More preferably, the composition comprises: 1.5*$Fe_2O_3$≤$Er_2O_3$−21.87*$Cr_2O_3$−53.12*Co or even, 1.7*$Fe_2O_3$≤$Er_2O_3$−21.87*$Cr_2O_3$−53.12*Co, or even better, 1.8*$Fe_2O_3$≤$Er_2O_3$−21.87*$Cr_2O_3$−53.12*Co. These minimum values allow to better target the objective and reach high luminous transmission. Preferably, the composition comprises: $Er_2O_3$−21.87*$Cr_2O_3$−53.12*Co≤2.4*$Fe_2O_3$. More preferably, the composition comprises: $Er_2O_3$−21.87*$Cr_2O_3$−53.12*Co≤2.2*$Fe_2O_3$ or even, $Er_2O_3$−21.87*$Cr_2O_3$−53.12*Co≤2*$Fe_2O_3$. To avoid any doubt herein, each embodiment concerning lower limits is of course combinable independently with any possible embodiment concerning higher limits.

According to a particularly advantageous second embodiment of the invention, the composition comprises selenium (expressed as Se) as follows: 3-50 ppm and cobalt (expressed as Co) as follows: 0.1-15 ppm.

According to this second main embodiment of the invention, preferably, the composition comprises Se≥4 ppm. More preferably, the composition comprises Se≥5 ppm. Also according to this third main embodiment of the invention, preferably, the composition comprises Se≤45 ppm, or even, Se≤40 ppm, or even better, Se≤35 ppm. More preferably, the composition comprises Se≤30 ppm or even Se≤25 ppm or even better Se≤20 ppm or ≤15 ppm, ≤10 ppm. These decreasing maximum values allow to minimize the negative effect of selenium on luminous transmission. To avoid any doubt herein, each embodiment concerning lower limits in Se is of course combinable independently with any possible embodiment concerning higher limits.

Still according to this second main embodiment of the invention, preferably, the composition comprises Co≥0.2 ppm or better, Co≥0.3 ppm, or even more better Co≥0.4 ppm. More preferably, the composition comprises Co≥0.45 ppm or better, Co≥0.5 ppm, or even more better Co≥0.6 ppm. Also according to the second main embodiment of the invention, preferably, the composition comprises Co≤12 ppm, or even, ≤10 ppm, or even better, ≤8 ppm. More preferably, the composition comprises Co≤6 ppm or even ≤5 ppm or even better ≤4 ppm or ≤3 ppm or ≤2 ppm or ≤1.5 ppm or ≤1 ppm or ≤0.75 ppm. These decreasing maximum values allow to minimize the negative effect of cobalt on luminous transmission. To avoid any doubt herein, each embodiment concerning lower limits in Co is of course combinable independently with any possible embodiment concerning higher limits.

According to a particularly advantageous third main embodiment of the invention, the composition comprises chromium (expressed as $Cr_2O_3$) as follows: 3-75 ppm and manganese (expressed as MnO) as follows: 50-1000 ppm.

According to this third main embodiment of the invention, preferably, the composition the composition comprises MnO≥70 ppm. More preferably, the composition comprises MnO≥100 ppm or even, ≥150 ppm or even better, MnO≥200 ppm. These minimum values allow to reach a lower effect on the color (a* coordinate). Still according to the third main embodiment of the invention, preferably also, the composition comprises MnO≤900 ppm. More preferably, the composition comprises MnO≤800 ppm or even ≤700 ppm or even better ≤600 ppm. Even more preferably, the composition comprises MnO≤500 ppm or even ≤400 ppm These decreasing maximum values allow to keep a high luminous transmission and avoid as much as possible the solarisation phenomenon. To avoid any doubt herein, each embodiment concerning lower limits in MnO is of course combinable independently with any possible embodiment concerning higher limits.

Still according to the third main embodiment of the invention, preferably, the composition comprises $Cr_2O_3$≥5 ppm. More preferably, the composition comprises $Cr_2O_3$≥10 ppm, or even ≥15 ppm. These minimum values allow to reach the target in color in combination with manganese, and also to reach a high IR transmission. Also according to the third main embodiment of the invention, preferably also, the composition comprises $Cr_2O_3$≤50 ppm. More preferably, the composition comprises $Cr_2O_3$≤40 ppm or even, ≤30 ppm, or even better, ≤25 ppm. These decreasing maximum values allow to keep a high luminous transmission while reaching the desired color. To avoid any doubt herein, each embodiment concerning lower limits in $Cr_2O_3$ is of course combinable independently with any possible embodiment concerning higher limits.

Still according to the third main embodiment of the invention, preferably also, the composition comprises: $Cr_2O_3=0.04*MnO+(Fe_2O_3/100)*x$; x being between 15 and 30 and $Cr_2O_3$, MnO and $Fe_2O_3$ being expressed in ppm. This allows to reach a high luminous transmission while reaching low $N^*_5$. Alternatively, the composition comprises: $Cr_2O_3=-0.02*MnO+x$; x being between 15 and 30 and $Cr_2O_3$ and MnO being expressed in ppm. This allows to reach a high luminous transmission, while reaching low $N^*_5$ and while also taking into account the reduced general impact of manganese in industrial conditions (furnace).

According to a particular mode of the third main embodiment of the invention, the composition may also comprises Co as follows: 0.25-20 ppm. Preferably, according to this particular mode, the composition comprises Co≥0.5 ppm, or even ≥1 ppm, or even better, ≥1.5 ppm. More preferably, the composition comprises Co≥2 ppm, or even ≥2.5 ppm, or even better, ≥3 ppm. This allows to still better target the $N^*_5$ value. Preferably also, the composition comprises Co≤18 ppm, or even ≤16 ppm, or even better, ≤14 ppm. More preferably, the composition comprises Co≤12 ppm, or even ≤10 ppm, or even better, ≤8 ppm. Even more preferably, the composition comprises Co≤6 ppm, or even ≤5 ppm, or even better, ≤4 ppm. This allows to still better target the $N^*_5$ value while keeping a high luminous transmission. To avoid any doubt herein, each embodiment concerning lower limits in Co is of course combinable independently with any possible embodiment concerning higher limits. Still according to this particular mode, the composition preferably comprises: $Co=0.17*Cr_2O_3+y$; y being between 0 and 4 and and $Cr_2O_3$ and Co being expressed in ppm. This allows to better target the $N^*_5$ value by a fine-tuning depending on the chromium amount.

According to another embodiment, the composition of the glass sheet comprises ZnO in a content lower than 0.1 wt %. Preferably, the composition of the glass sheet comprises ZnO in a content lower than 0.01 wt %. More preferably, the composition of the glass sheet is free of ZnO. This means that the element zinc is not intentionally added in the glass batch/raw materials and that, if it is present, ZnO content in the composition of the glass sheet reaches only level of an impurity unavoidably included in the production.

According to still another embodiment, the composition of the glass sheet comprises SrO in a content lower than 0.1 wt %. Preferably, the composition of the glass sheet comprises SrO in a content lower than 0.01 wt %. More preferably, the composition of the glass sheet is free of SrO. This means that the element strontium is not intentionally added in the glass batch/raw materials and that, if it is present, SrO content in the composition of the glass sheet reaches only level of an impurity unavoidably included in the production.

According to still another embodiment, the composition of the glass sheet comprises $Sb_2O_3$ in a content lower than 0.1 wt %. Preferably, the composition of the glass sheet comprises $Sb_2O_3$ in a content lower than 0.01 wt %. More preferably, the composition of the glass sheet is free of $Sb_2O_3$. This means that the element antimony is not intentionally added in the glass batch/raw materials and that, if it is present, $Sb_2O_3$ content in the composition of the glass sheet reaches only level of an impurity unavoidably included in the production.

According to still another embodiment, the composition of the glass sheet comprises $SnO_2$ in a content lower than 0.1 wt %. The $SnO_2$ content herein means the $SnO_2$ content in the bulk of the glass sheet, excluding the so-called "tin face" in the case of a float glass sheet. Preferably, the composition of the glass sheet comprises $SnO_2$ in a content lower than 0.03 wt %. More preferably, the composition of the glass sheet comprises $SnO_2$ in a content lower than 0.01 wt %. In the most preferred embodiment, the composition of the glass sheet is free of $SnO_2$. This means that the element tin is not intentionally added in the glass batch/raw materials and that, if it is present, $SnO_2$ content in the composition of the glass sheet reaches only level of an impurity unavoidably included in the production.

Advantageously, the glass sheet of the invention may be tempered, mechanically or chemically. It may also be bended/curved, or in a general manner, deformed to reach any desired configuration (by cold-bending, thermo-forming, . . . ). It may also be laminated.

According to an embodiment of the invention, the glass sheet is coated with at least one transparent and electrically conducting thin layer. A transparent and conducting thin layer according to the invention can, for example, be a layer based on $SnO_2$:F, $SnO_2$:Sb or ITO (indium tin oxide), ZnO:Al or also ZnO:Ga.

According to another advantageous embodiment of the invention, the glass sheet is coated with at least one antireflection layer. This embodiment is obviously advantageous in the case of use of the glass sheet of the invention as front face of a screen. An antireflection layer according to the invention can, for example, be a layer based on porous silica having a low refractive index or it can be composed of several layers (stack), in particular a stack of layers of dielectric material alternating layers having low and high refractive indexes and terminating in a layer having a low refractive index.

According to another embodiment, the glass sheet is coated with at least one anti-fingerprint layer or has been treated so as to reduce or prevent fingerprints from registering. This embodiment is also advantageous in the case of use of the glass sheet of the invention as front face of a touchscreen. Such a layer or such a treatment can be combined with a transparent and electrically conducting thin layer deposited on the opposite face. Such a layer can be combined with an antireflection layer deposited on the same face, the anti-fingerprint layer being on the outside of the stack and thus covering the antireflection layer.

According to still another embodiment, the glass sheet is coated with at least one layer or has been treated so as to reduce or prevent glaring and/or sparkling. This embodiment is of course advantageous in the case of use of the glass sheet of the invention as front face of a display device. Such an anti-glare or anti-sparkling treatment is for example an acid-etching producing a specific roughness of the treated face of the glass sheet.

According to still another embodiment, the glass sheet has been treated so as to gain antibacterial properties (i.e. through a known silver treatment). Such a treatment is also advantageous in the case of use of the glass sheet of the invention as front face of a display device.

According to still another embodiment, the glass sheet is coated with at least one paint layer including enamel, organic paint, lacquer, . . . . This paint layer may advantageously be colored or white. According to this embodiment, the glass sheet may be coated on at least one face in its entire surface or only partially.

According to the applications and/or properties desired, other layer(s)/treatment(s) can be deposited/done on one and/or the other face of the glass sheet according to the invention.

The glass sheets of the invention is of particular interest if integrated in/associated with/used as objects as diversified as: furniture (tables, shelves, chairs, doors, . . . ), electronic devices, appliances, white boards, credencies, shower doors, wall panels, facades, interior partitions, lighting, . . . .

Embodiments of the invention will now be further described, by way of examples only, together with some comparative examples, not in accordance with the invention. The following examples are provided for illustrative purposes, and are not intended to limit the scope of this invention.

Examples

Illustration of the General Concept of the Invention

In order to illustrate the global concept of the invention, we have conducted several simulations of glass color for different thicknesses, simulating glasses from the state-of-the-art (a classical solar low-iron glass sheets and a known neutralized low-iron glass sheet) and a glass according to the invention. From the absorbing coefficient of various coloring agents in glass, one can obtain a given optical spectrum at different thicknesses. It is then possible to obtain the variation of color according to the thickness of the glass.

Figure 1:
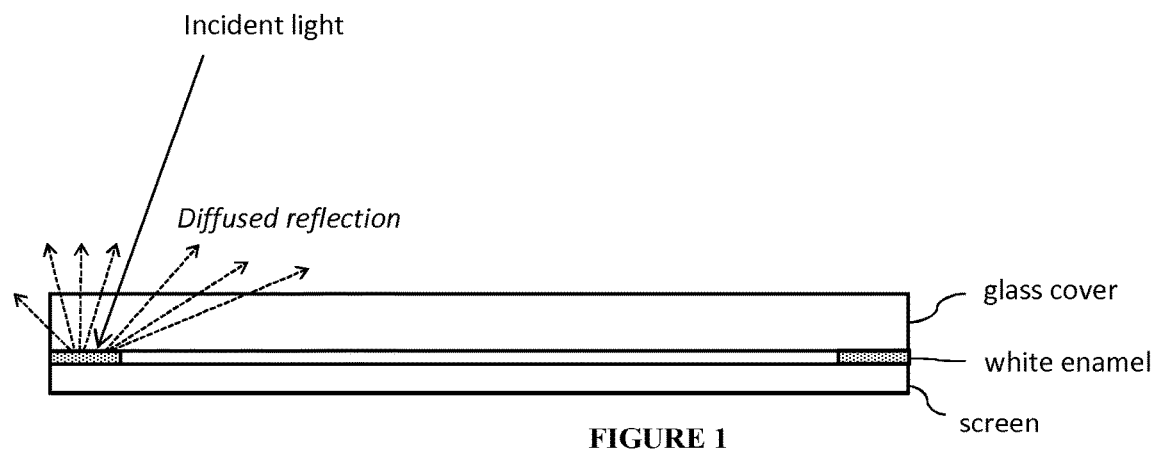
FIG. 1 is a cross-sectional view of glass sheet cover for a known display illustrating diffusion of light.
Figure 2:
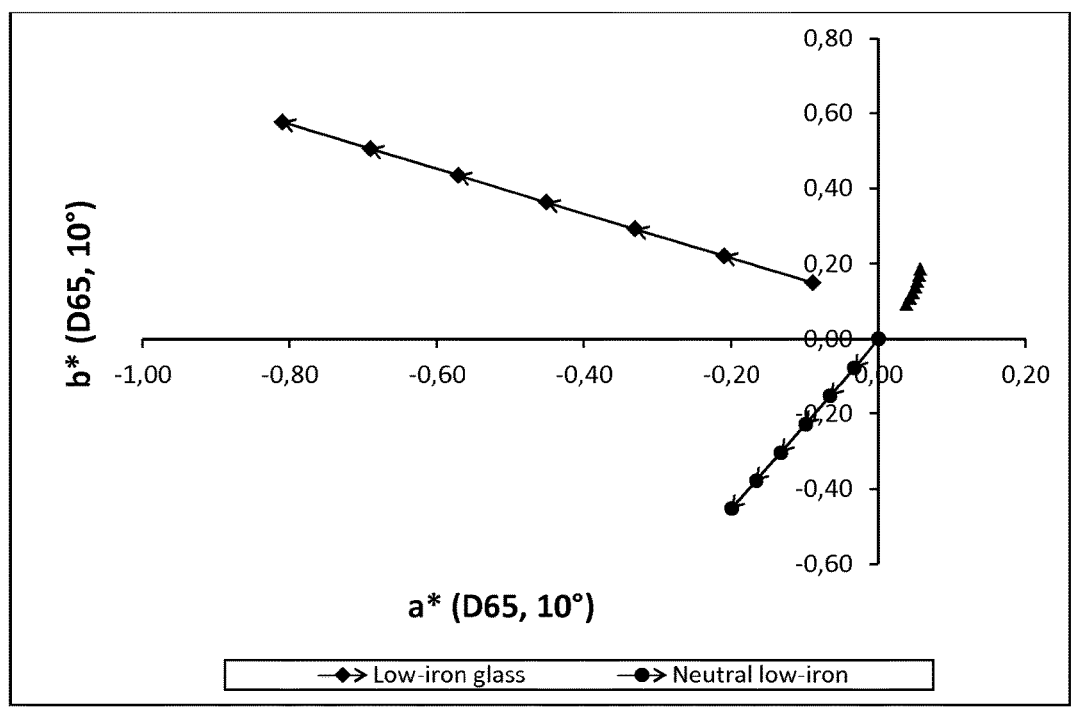
FIG. 2(a) is a plot of a glass color simulation in a*, b* at thicknesses from 5 to 35 mm.
FIG. 2(b) is an enlarged view of FIG. 2(a).
Figure 2:
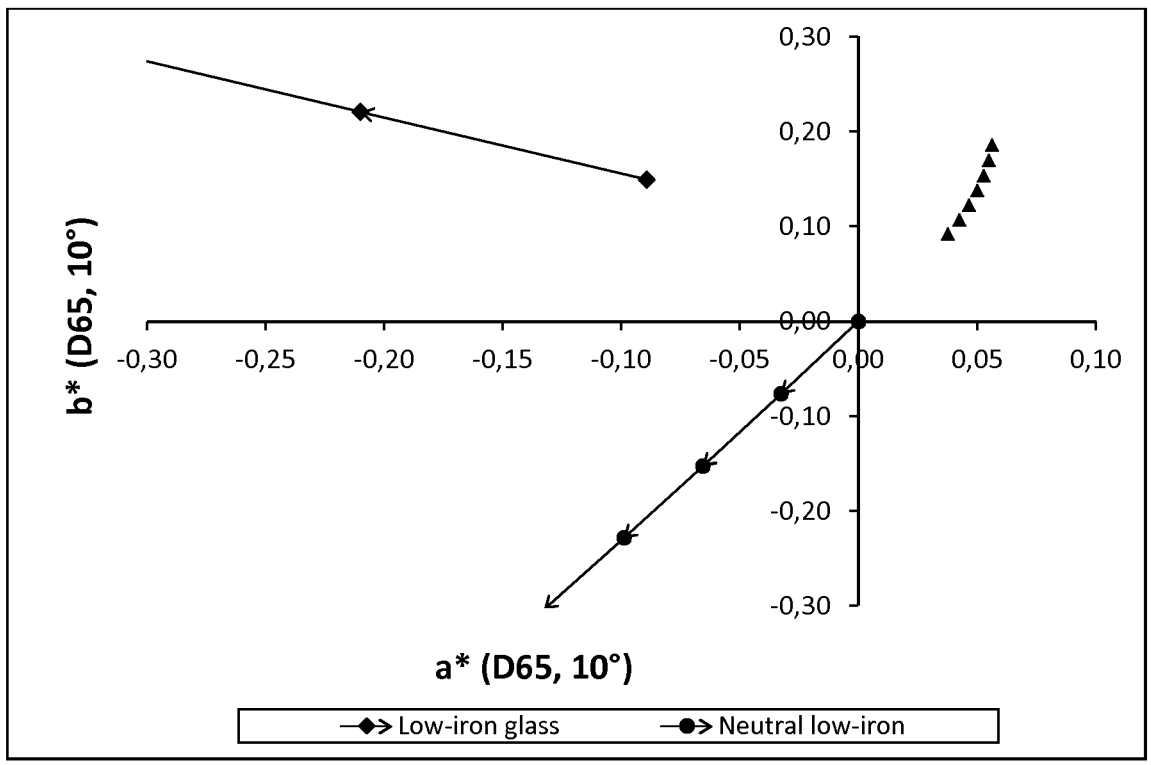

Table 1 and FIG. 2(a) show the results of this simulation of color in a*,b* (increased thickness by step of 5 mm, from 5 to 35 mm). An enlarged view of FIG. 2(a) for a specific a*b* zone is also given at FIG. 2(b).

TABLE 1

|  |  | 5 | 10 | 15 | 20 | 25 | 30 | 35 |
|---|---|---|---|---|---|---|---|---|
|  | Thickness (mm) |  |  |  |  |  |  |  |
| Solar low-iron glass | LTD (%, D65, 2°) | 91.67 | 91.45 | 91.23 | 91.02 | 90.80 | 90.58 | 90.37 |
|  | a* (D65, 10°) | −0.09 | −0.21 | −0.33 | −0.45 | −0.57 | −0.69 | −0.81 |
|  | b* (D65, 10°) | 0.15 | 0.22 | 0.29 | 0.36 | 0.43 | 0.51 | 0.58 |
|  | N | 0.17 | 0.30 | 0.44 | 0.58 | 0.72 | 0.86 | 0.99 |
|  | $N_x^*$ | 0.14 | 0.28 | 0.42 | 0.56 | 0.70 | 0.84 | 0.98 |
| Neutralized low iron glass | LTD (%, D65, 2°) | 91.40 | 90.92 | 90.45 | 89.98 | 89.50 | 89.04 | 88.57 |
|  | a* (D65, 10°) | 0.00 | −0.03 | −0.07 | −0.10 | −0.13 | −0.17 | −0.20 |
|  | b* (D65, 10°) | 0.00 | −0.08 | −0.15 | −0.23 | −0.30 | −0.38 | −0.45 |
|  | N | 0.00 | 0.08 | 0.17 | 0.25 | 0.33 | 0.41 | 0.49 |
|  | $N_x^*$ | 0.09 | 0.17 | 0.25 | 0.33 | 0.42 | 0.50 | 0.58 |
| Invention | LTD (%, D65, 2°) | 91.57 | 91.26 | 90.95 | 90.64 | 90.33 | 90.03 | 89.72 |
|  | a* (D65, 10°) | 0.04 | 0.04 | 0.05 | 0.05 | 0.05 | 0.06 | 0.06 |
|  | b* (D65, 10°) | 0.09 | 0.11 | 0.12 | 0.14 | 0.15 | 0.17 | 0.19 |
|  | N | 0.10 | 0.12 | 0.13 | 0.15 | 0.16 | 0.18 | 0.19 |
|  | $N_x^*$ | 0.01 | 0.03 | 0.05 | 0.06 | 0.08 | 0.09 | 0.11 |

One can observe in a known and predictable manner that a significant shift in color (a*, b*) happens while glass thickness increases in the case of the glass sheets according to the state-of-the-art. Moreover, even a glass sheet that is said to be "neutral" (low N factor, i.e. N=0.09) is actually neutral only at a given thickness (here 5 mm) and is quickly less neutral (higher N factor) than another thinner classical low-iron glass from the state-of-the-art. Conversely, the glass sheet of the invention, which has a very low $N^*_5$ factor (0.01) and which is also very close to neutrality (low N factor) remains almost neutral and keeps significantly its color whatever the thickness (a*, b* and N factor remains sensibly constant when thickness increases, mostly compared to sheets from the art). This is particularly well illustrated when looking at FIG. 2.

This observation is moreover true whatever the way to reach targeted $N^*_5$ of the invention but several ways to achieve it are also given hereunder.

Glass Sheets with Specific Compositions and their Evaluation

Different glass sheets according to the invention or comparative were prepared in lab or industrially or calculated/simulated, as 3 sets of examples.

The glass sheets of examples EX1.x, EX2.x were produced industrially and their optical properties were measured. The $N^*$ factors at 5 mm ($N^*_5$) for EX1.x and EX2.x were computed by making a linear extrapolation of the $N^*$ values at the different available thicknesses.

Tables 2(a) to (c) show the compositions and the measured optical properties of comparative examples EX1.x (Table 2(a)) and comparative examples EX2.x (Table 2(b) and (c)).

TABLE 2(a)

| | Comparative Examples: Clear glass sheets | | | | | | |
|---|---|---|---|---|---|---|---|
| | EX1.1 | EX1.2 | EX1.3 | EX1.4 | EX1.5 | EX1.6 | EX1.7 |
| Thickness (mm) | 0.53 | 0.72 | 0.99 | 1.2 | 1.57 | 1.87 | 2.08 |
| CaO (wt %) | 7.86 | 7.82 | 7.91 | 7.87 | 7.92 | 8.00 | 7.95 |
| $K_2O$ (wt %) | 0.35 | 0.38 | 0.23 | 0.24 | 0.20 | 0.20 | 0.20 |
| $Na_2O$ (wt %) | 13.36 | 13.38 | 13.95 | 13.91 | 13.89 | 13.93 | 13.90 |
| $Fe_2O_3$ (wt %) | 0.1030 | 0.1040 | 0.1040 | 0.1040 | 0.1030 | 0.1030 | 0.1040 |
| $Al_2O_3$ (wt %) | 1.92 | 1.91 | 1.34 | 1.36 | 1.26 | 1.28 | 1.28 |
| MgO (wt %) | 4.71 | 4.68 | 4.46 | 4.51 | 4.50 | 4.51 | 4.51 |
| Co (ppm) | — | — | — | — | — | — | — |
| $Er_2O_3$ (ppm) | | | | | | | |
| $Cr_2O_3$ (ppm) | — | — | — | — | — | — | — |
| LTD (%, D65, 2°) | 91.67 | 91.45 | 91.23 | 91.02 | 90.80 | 90.58 | 90.37 |
| a* (D65, 10°) | −0.09 | −0.21 | −0.33 | −0.45 | −0.57 | −0.69 | −0.81 |
| b* (D65, 10°) | 0.15 | 0.22 | 0.29 | 0.36 | 0.43 | 0.51 | 0.58 |
| N | 0.17 | 0.30 | 0.44 | 0.58 | 0.72 | 0.86 | 0.99 |
| $N_x^*$ | 0.26 | 0.31 | 0.35 | 0.43 | 0.52 | 0.64 | 0.67 |
| $N_5^*$ (extrapolated) | | | | 1.47 | | | |

The optical properties, when measured on prepared/produced samples, were determined on a Perkin Elmer Lambda 950 spectrophotometer fitted with an integrating sphere of 150 mm in diameter, and in particular:

The luminous transmission LTD was determined according to the ISO9050 standard with a solid viewing angle of 2° (D65 illuminant) and for a wavelength range between 380 and 780 nm;

The CIE L* a*b* parameters were determined in transmission with the following parameters: Illuminant D65, 10°.

In case of industrially produced sheets, both surfaces were mirror polished in a known manner prior to measurement For the lab preparation of glass sheets: Powder raw materials were mixed together, in amounts according to the targeted composition, and placed in melting crucibles. The raw material mixture was then heated up in an electrical furnace to a temperature allowing complete melting of the raw material.

For glass sheets produced industrially: they were produced classically on a mass production float furnace.

For the simulation/computation: the optical properties were calculated on the basis of optical properties of different glass colorants (using linear absorption coefficient, determined for the concerned base glass matrix, to build the complete optical spectra and compute the parameters of interest).

Glass Sheets from the State of the Art

EX1.x examples (comparative) correspond to classical clear glass sheets (total iron content ~0.1 wt %) with different thicknesses.

EX2.x examples (comparative) correspond to classical low-iron glass sheets (total iron content ~0.012 wt %) with different thicknesses: EX2.1-2.4 correspond to solar-quality low-iron glass; and EX2.5-2.10 correspond to low-iron glass sheets with cobalt (as the ones described in DE29819347U1).

TABLE 2(b)

| Solar low-iron glass sheets | Comparative Examples: | | | | |
|---|---|---|---|---|---|
| | EX2.1 | EX2.2 | EX2.3 | EX2.4 | EX2.4 |
| Thickness (mm) | 0.72 | 0.98 | 2.09 | 3.79 | 3.99 |
| CaO (wt %) | 7.93 | 7.90 | 7.93 | 7.90 | 7.93 |
| $K_2O$ (wt %) | 0.02 | 0.02 | 0.02 | 0.02 | 0.02 |
| $Na_2O$ (wt %) | 13.96 | 13.91 | 13.91 | 13.91 | 13.95 |
| $Fe_2O_3$ (wt %) | 0.0120 | 0.0116 | 0.0120 | 0.0116 | 0.0128 |
| $Al_2O_3$ (wt %) | 1.34 | 1.33 | 1.32 | 1.34 | 1.33 |
| MgO (wt %) | 4.46 | 4.45 | 4.46 | 4.44 | 4.53 |
| Co (ppm) | — | — | — | — | — |
| $Er_2O_3$ (ppm) | | | | | |
| $Cr_2O_3$ (ppm) | — | — | — | — | — |
| LTD (%, D65, 2°) | 91.75 | 91.80 | 91.67 | 91.45 | 91.57 |
| a* (D65, 10°) | −0.03 | −0.02 | −0.07 | −0.16 | −0.14 |
| b* (D65, 10°) | 0.20 | 0.19 | 0.19 | 0.15 | 0.15 |
| N | 0.20 | 0.19 | 0.20 | 0.22 | 0.21 |
| $N_x^*$ | 0.13 | 0.12 | 0.15 | 0.20 | 0.18 |
| $N_5^*$ (extrapolated) | | | 0.21 | | |

TABLE 2(c)

| Low-iron glass sheets with cobalt | Comparative Examples: | | | | |
|---|---|---|---|---|---|
| | EX2.6 | EX2.7 | EX2.8 | EX2.9 | EX2.10 |
| Thickness (mm) | 3.86 | 5.87 | 7.69 | 9.75 | 11.95 |
| CaO (wt %) | 7.93 | 7.93 | 7.93 | 7.93 | 7.93 |
| $K_2O$ (wt %) | 0.02 | 0.02 | 0.02 | 0.02 | 0.02 |
| $Na_2O$ (wt %) | 13.95 | 13.95 | 13.95 | 13.95 | 13.95 |
| $Fe_2O_3$ (wt %) | 0.0121 | 0.0122 | 0.0121 | 0.0132 | 0.0120 |
| $Al_2O_3$ (wt %) | 1.33 | 1.33 | 1.33 | 1.33 | 1.33 |
| MgO (wt %) | 4.53 | 4.53 | 4.53 | 4.53 | 4.53 |

TABLE 2(c)-continued

| Low-iron glass sheets with cobalt | Comparative Examples: | | | | |
|---|---|---|---|---|---|
| | EX2.6 | EX2.7 | EX2.8 | EX2.9 | EX2.10 |
| Co (ppm) | 0.3 | 0.3 | 0.3 | 0.3 | 0.3 |
| $Er_2O_3$ (ppm) | — | — | — | — | — |
| $Cr_2O_3$ (ppm) | — | — | — | — | — |
| LTD (%, D65, 2°) | 91.6 | 91.5 | 91.4 | 91.2 | 91.0 |
| a* (D65, 10°) | −0.15 | −0.25 | −0.33 | −0.43 | −0.53 |
| b* (D65, 10°) | 0.09 | 0.07 | 0.07 | 0.05 | 0.09 |
| N | 0.17 | 0.26 | 0.34 | 0.43 | 0.54 |
| $N_x$* | 0.19 | 0.29 | 0.37 | 0.47 | 0.57 |
| $N_3$* (extrapolated) | | | 2.23 | | |

Set 1: Glass Sheets Comprising Erbium

EX3 example corresponds to a glass sheet according to the invention with a 2 mm-thickness, comprising an amount of total iron (~0.015 wt %) close to that of a classical low-iron glass of the state-of-the-art and in which erbium was added according to an embodiment of the invention.

The glass sheet of EX3 was produced industrially and its optical properties were measured and shown at Table 2(d).

EX4.x examples correspond to glass sheets according to the invention with varying thicknesses, comprising an amount of total iron (~0.01 wt %) close to that of a classical low-iron glass of the state-of-the-art and an amount of erbium (0.025 wt %) according to an embodiment of the invention. The optical properties of glass sheets of EX4.x were computed as described above and shown in Table 2(e).

EX5.x examples (comparative) correspond to glass sheets (classical soda-lime glass matrix) with varying thicknesses, comprising an amount of total iron (0.011 wt %) close to that of a classical low-iron glass of the state-of-the-art and an amount of erbium (0.098 wt %). The optical properties of glass sheets of EX5.x were measured (EX5.1) or computed (EX5.2-5.7) as described above and shown in Table 2(f).

Figure 3:
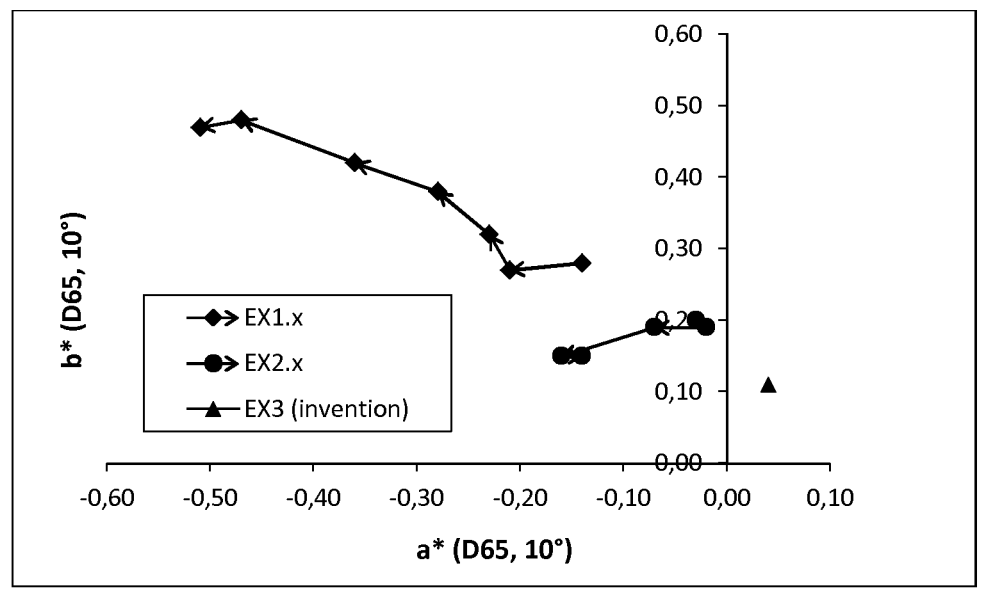
FIG. 3 shows an evolution of a*, b* comparing a clear glass, a low iron-glass, and a glass according to the invention.

FIG. 3 shows the evolution of a*, b* according to thickness, for each EX1.x (clear glasses); EX2.x (low-iron glasses), EX3 (invention). The evolution of a*, b* according to thickness for EX4.x was already exposed at FIG. 2, in order to illustrate the general concept of the invention.

One can clearly observe from those results that, in a known and predictable manner, for a clear glass sheet and also for a low-iron glass sheet, color is significantly shifted (in this case towards greenish aspect) while thickness increases. Conversely, the glass sheet of the invention, which has a very low N* factor at available thickness from industrial production (1.99 mm), will keep such a low N* factor at 5 mm thickness (a*, b* remains sensibly constant when thickness increases, mostly compared to sheets from the art). This is illustrated when looking at FIGS. 2 and 3. Table 2(f) with EX5.x also show that if the requirement of low value for N* factor is not addressed, one cannot get constant color/neutrality irrespective of glass thickness.

TABLE 2(d)

| Example according to the invention | EX3 |
|---|---|
| Thickness (mm) | 1.99 |
| CaO (wt %) | 0.96 |
| $K_2O$ (wt %) | 1.06 |
| $Na_2O$ (wt %) | 15.81 |
| $Fe_2O_3$ (wt %) | 0.0147 |
| $Al_2O_3$ (wt %) | 5.79 |
| MgO (wt %) | 9.52 |
| Co (ppm) | 1.0 |
| $Er_2O_3$ (ppm) | 479 |
| $Cr_2O_3$ (ppm) | 7.0 |
| LTD (%, D65, 2°) | 91.61 |
| a* (D65, 10°) | 0.04 |
| b* (D65, 10°) | 0.11 |
| N | 0.12 |
| $N_x$* | 0.03 |

TABLE 2(e)

| | Examples according to the invention | | | | | | |
|---|---|---|---|---|---|---|---|
| | EX4.1 | EX4.2 | EX4.3 | EX4.4 | EX4.5 | EX4.6 | EX4.7 |
| Thickness (mm) | 5 | 10 | 15 | 20 | 25 | 30 | 35 |
| $Fe_2O_3$ (wt %) | 0.01 | 0.01 | 0.01 | 0.01 | 0.01 | 0.01 | 0.01 |
| $Er_2O_3$ (ppm) | 0.025 | 0.025 | 0.025 | 0.025 | 0.025 | 0.025 | 0.025 |
| LTD (%, D65, 2°) | 91.57 | 91.26 | 90.95 | 90.64 | 90.33 | 90.03 | 89.72 |
| a* (D65, 10°) | 0.04 | 0.04 | 0.05 | 0.05 | 0.05 | 0.06 | 0.06 |
| b* (D65, 10°) | 0.09 | 0.11 | 0.12 | 0.14 | 0.15 | 0.17 | 0.19 |
| N | 0.10 | 0.12 | 0.13 | 0.15 | 0.16 | 0.18 | 0.19 |
| $N_x$* | 0.01 | 0.03 | 0.05 | 0.06 | 0.08 | 0.09 | 0.11 |

TABLE 2(f)

| | Comparative Examples: Low-iron glass sheets with erbium | | | | | | |
|---|---|---|---|---|---|---|---|
| | EX5.1 | EX5.2 | EX5.3 | EX5.4 | EX5.5 | EX5.6 | EX5.7 |
| Thickness (mm) | 5 | 10 | 15 | 20 | 25 | 30 | 35 |
| $Fe_2O_3$ (wt %) | 0.011 | 0.011 | 0.011 | 0.011 | 0.011 | 0.011 | 0.011 |
| $Er_2O_3$ (ppm) | 0.098 | 0.098 | 0.098 | 0.098 | 0.098 | 0.098 | 0.098 |
| LTD (%, D65, 2°) | 83.0 | 75.2 | 68.0 | 61.6 | 55.8 | 50.6 | 45.9 |

TABLE 2(f)-continued

| | Comparative Examples: Low-iron glass sheets with erbium | | | | | | |
|---|---|---|---|---|---|---|---|
| | EX5.1 | EX5.2 | EX5.3 | EX5.4 | EX5.5 | EX5.6 | EX5.7 |
| a* (D65, 10°) | 1.96 | 3.74 | 5.41 | 6.96 | 8.40 | 9.73 | 10.96 |
| b* (D65, 10°) | 1.13 | 2.09 | 2.97 | 3.77 | 4.49 | 5.14 | 5.72 |
| N | 2.26 | 4.29 | 6.17 | 7.91 | 9.52 | 11.00 | 12.37 |
| $N_x^*$ | 2.19 | 4.22 | 6.10 | 7.84 | 9.45 | 10.93 | 12.30 |

Set 2: Glass Sheets Comprising Selenium and Cobalt

Hereunder is shown how the use of selenium and cobalt together with a low $N^*_5$ according to the invention allows to reach a significantly constant color whatever the glass thickness.

EX6.1 and 6.2 examples, prepared in lab, correspond to soda-lime-silica glass sheets according to the invention with a 5 mm thickness, comprising an amount of total iron (~0.01 wt %) close to that of a classical low-iron glass of the state-of-the-art and in which selenium and cobalt are present according to an embodiment of the invention.

The optical properties of glass sheets of EX6.1 and 6.2 were measured on the lab samples. The effect of some added cobalt was computed as described above. Results are shown in Table 3(a).

EX6.3 to 6.9 examples (comparative) correspond to glass sheets (classical soda-lime glass matrix) with varying thicknesses, comprising an amount of total iron (0.01 wt %) close to that of a classical low-iron glass of the state-of-the-art and amounts of selenium an cobalt. The optical properties of glass sheets were measured (EX6.3) or computed (EX6.4-6.9) as described above and shown in Table 3(b).

Set 3: Glass Sheets Comprising Chromium and Manganese

Hereunder is shown how the use of chromium and manganese together with a low $N^*_5$ according to the invention allows to reach a significantly constant color whatever the glass thickness.

EX7 and EX8 examples, prepared in lab, correspond to soda-lime silica glass sheets according to the invention with a 5 mm thickness, comprising low amount in total iron and in which chromium, manganese and cobalt are present according to an embodiment of the invention. EX9 and EX10 examples, prepared in the lab, correspond to comparative soda-lime silica glass sheets with a 5 mm thickness. The optical properties of glass sheets of EX7-10 were measured and the effect of added cobalt was computed as described above. Results are shown in Table 4(a).

EX11.x examples (comparative) correspond to glass sheets (classical soda-lime glass matrix) with varying thicknesses, comprising an amount of total iron (0.011 wt %) close to that of a classical low-iron glass of the state-of-the-art and amounts of chromium and manganese. The optical properties of glass sheets of EX11.x were measured (EX11.1) or computed (EX11.2-11.7) as described above and shown in Table 4(b).

TABLE 3(a)

| Examples according to the invention | EX6.1 | EX6.2 |
|---|---|---|
| Thickness (mm) | 5 | 5 |
| $Fe_2O_3$ (wt %) | 0.0102 | 0.0102 |
| Se (ppm) | 6 | 7 |
| Co (ppm) | 0.4 | 0.5 |
| LTD (%, D65, 2°) | 90.95 | 90.94 |
| a* (D65, 10°) | 0.01 | 0.01 |
| b* (D65, 10°) | 0.08 | 0.08 |
| N | 0.08 | 0.08 |
| $N_x^*$ | 0.02 | 0.02 |

TABLE 4(a)

| | EX7 | EX8 | EX9 | EX10 |
|---|---|---|---|---|
| Thickness (mm) | 5 | 5 | 5 | 5 |
| $Fe_2O_3$ (wt %) | 0.0246 | 0.0107 | 0.0116 | 0.0101 |
| $Cr_2O_3$ (ppm) | 48 | 9 | 88 | 9 |
| MnO (ppm) | 332 | 300 | 3740 | 50 |
| Co (ppm) | 10.1 | 3.6 | 19.2 | 1.9 |
| LTD (%, D65, 2°) | 84.87 | 89.68 | 34.29 | 90.66 |
| a* (D65, 10°) | 0.03 | 0.02 | 20.26 | −0.43 |
| b* (D65, 10°) | 0.08 | 0.08 | 0.08 | 0.08 |
| N | 0.09 | 0.08 | 20.26 | 0.44 |
| $N_5^*$ | 0.00 | 0.01 | 20.23 | 0.46 |

TABLE 3(b)

| | Comparative Examples: Low-iron glass sheets with selenium and cobalt | | | | | | |
|---|---|---|---|---|---|---|---|
| | EX6.3 | EX6.4 | EX6.5 | EX6.6 | EX6.7 | EX6.8 | EX6.9 |
| Thickness (mm) | 5 | 10 | 15 | 20 | 25 | 30 | 35 |
| $Fe_2O_3$ (wt %) | 0.01 | 0.01 | 0.01 | 0.01 | 0.01 | 0.01 | 0.01 |
| Se (ppm) | 9 | 9 | 9 | 9 | 9 | 9 | 9 |
| Co (ppm) | 3 | 3 | 3 | 3 | 3 | 3 | 3 |
| LTD (%, D65, 2°) | 90.3 | 88.7 | 87.2 | 85.7 | 84.3 | 82.8 | 81.4 |
| a* (D65, 10°) | 0.04 | 0.05 | 0.06 | 0.07 | 0.08 | 0.09 | 0.11 |
| b* (D65, 10°) | −0.20 | −0.47 | −0.75 | −1.02 | −1.28 | −1.55 | −1.81 |
| N | 0.20 | 0.48 | 0.75 | 1.02 | 1.29 | 1.55 | 1.81 |
| $N_x^*$ | 0.28 | 0.55 | 0.83 | 1.10 | 1.37 | 1.63 | 1.89 |

TABLE 4(b)

| Comparative Examples: Low-iron glass sheets with chromium and manganese | | | | | | | |
|---|---|---|---|---|---|---|---|
| | EX11.1 | EX11.2 | EX11.3 | EX11.4 | EX11.5 | EX11.6 | EX11.7 |
| Thickness (mm) | 5 | 10 | 15 | 20 | 25 | 30 | 35 |
| $Fe_2O_3$ (wt %) | 0.011 | 0.011 | 0.011 | 0.011 | 0.011 | 0.011 | 0.011 |
| $Cr_2O_3$ (ppm) | 25 | 25 | 25 | 25 | 25 | 25 | 25 |
| MnO (ppm) | 205 | 205 | 205 | 205 | 205 | 205 | 205 |
| LTD (%, D65, 2°) | 91.1 | 90.4 | 89.7 | 89.1 | 88.4 | 87.8 | 87.3 |
| a* (D65, 10°) | 0.60 | 1.12 | 1.61 | 2.06 | 2.48 | 2.86 | 3.22 |
| b* (D65, 10°) | −0.11 | −0.28 | −0.43 | −0.57 | −0.69 | −0.80 | −0.90 |
| N | 0.61 | 1.16 | 1.67 | 2.14 | 2.57 | 2.97 | 3.34 |
| $N_x$* | 0.59 | 1.15 | 1.65 | 2.13 | 2.56 | 2.96 | 3.33 |

The invention claimed is:

1. A glass sheet having a composition comprising the following in weight percentage, expressed with respect to a total weight of the glass:
 $SiO_2$ 40-78%;
 $Al_2O_3$ 0-18%;
 $B_2O_3$ 0-18%;
 $Na_2O$ 0-20%;
 CaO 0-15%;
 MgO 0-12%;
 $K_2O$ 0-12%;
 BaO 0-5%; and
 a total iron content of 0.002-0.03% expressed in the form of $Fe_2O_3$ and in weight percentage with respect to the total weight of glass, and wherein the glass satisfies the formula:
 $N^*_5 < 0.05$; $N^*_5$ being defined as $N^*_5 = \sqrt{(a^*_5 - a^*_0)^2 + (b^*_5 - b^*_0)^2}$, $a^*_5$ and $b^*_5$ being measured for a sheet thickness of 5 mm in transmission with illuminant D65, 10°, SCI; $a^*_0$ and $b^*_0$ being computed for a sheet thickness of 0 mm in transmission with illuminant D65, 10°, SCI, and
 wherein the composition further comprises
 erbium (expressed in the form of $Er_2O_3$) as follows: 0.003-0.5%, or
 selenium (expressed as Se) as follows: 3-50 ppm and cobalt (expressed as Co) as follows: 0.1-15 ppm.

2. The glass sheet according to claim 1, wherein the composition comprises: total iron 0.002-0.02 wt %.

3. The glass sheet according to claim 1, wherein the composition comprises: total iron 0.002-0.015 wt %.

4. The glass sheet according to claim 1, wherein the composition has a redox ratio ≤32%.

5. The glass sheet according to claim 1, wherein the composition comprises erbium (expressed in the form of $Er_2O_3$) as follows: 0.003-0.5 wt %.

6. The glass sheet according to claim 5, wherein the composition comprises: $Er_2O_3 \geq 0.01$ wt %.

7. The glass sheet according to claim 1, wherein the composition comprises: $Er_2O_3 \leq 0.1$ wt %.

8. The glass sheet according to claim 1, further comprising:
 erbium (expressed in the form of $Er_2O_3$) in an amount of 30 to 150 ppm.

9. The glass sheet according to claim 1, further comprising:
 erbium (expressed in the form of $Er_2O_3$) in an amount of 50 to 100 ppm.

10. The glass sheet according to claim 1, wherein the composition comprises selenium (expressed as Se) as follows: 3-50 ppm and cobalt (expressed as Co) as follows: 0.1-15 ppm.

11. The glass sheet according to claim 1, wherein the composition comprises Co as follows: 0.25-20 ppm.

12. The glass sheet according to claim 1, further comprising:
 cobalt (expressed as Co) in an amount of 0.5 to 5 ppm.

13. The glass sheet according to claim 1, further comprising:
 cobalt (expressed as Co) in an amount of 1 to 2 ppm.

14. The glass sheet according to claim 1, wherein $N^*_5 \leq 0.03$.

15. The glass sheet according to claim 1, wherein $N^*_5 \leq 0.01$.

16. A glass sheet having a composition comprising the following in weight percentage, expressed with respect to a total weight of the glass:
 $SiO_2$ 40-78%;
 $Al_2O_3$ 1-6%;
 $B_2O_3$ 0-18%;
 $Na_2O$ 0-20%;
 CaO 0-15%;
 MgO 0-12%;
 $K_2O$ 0-12%;
 BaO 0-5%; and
 a total iron content of 0.002-0.03% expressed in the form of $Fe_2O_3$ and in weight percentage with respect to the total weight of glass, and wherein the glass satisfies the formula:
 $N^*_5 < 0.05$; $N^*_5$ being defined as $N^*_5 = \sqrt{(a^*_5 - a^*_0)^2 + (b^*_5 - b^*_0)^2}$, $a^*_5$ and $b^*_5$ being measured for a sheet thickness of 5 mm in transmission with illuminant D65, 10°, SCI; $a^*_0$ and $b^*_0$ being computed for a sheet thickness of 0 mm in transmission with illuminant D65, 10°, SCI, and
 wherein the composition further comprises
 erbium (expressed in the form of $Er_2O_3$) as follows: 0.003-0.5 wt %, or
 selenium (expressed as Se) as follows: 3-50 ppm and cobalt (expressed as Co) as follows: 0.1-15 ppm.

* * * * *